United States Patent [19]

Mentzel

[11] 4,062,214
[45] Dec. 13, 1977

[54] APPARATUS FOR MEASURING CAMBER IN RAILS

[75] Inventor: Sigmund T. Mentzel, Crown Point, Ind.

[73] Assignee: United States Steel Corporation, Pittsburgh, Pa.

[21] Appl. No.: 707,392

[22] Filed: July 21, 1976

[51] Int. Cl.² ............................................. B21C 51/00
[52] U.S. Cl. ......................................... 72/34; 250/239
[58] Field of Search .................... 72/34, 9, 10, 12, 13, 72/16, 17, 31; 256/168; 250/239, 560, 561, 559

[56] References Cited

U.S. PATENT DOCUMENTS

| | | | |
|---|---|---|---|
| 533,714 | 2/1895 | Leighton | 72/12 |
| 3,499,306 | 3/1970 | Pearson | 72/17 |
| 3,990,284 | 11/1976 | Barten | 72/9 |

Primary Examiner—Milton S. Mehr
Attorney, Agent, or Firm—Frank Madonia

[57] ABSTRACT

An electronic camber measuring device for hot rails utilizes the radiant energy of the rails for measuring the amount of camber imparted to the rail in a rail mill by measuring deflection in the end of the rail with respect to the centerline of the mill. Phototransistors are coupled to a readout console through digital circuitry. The readout console has a visual and audible alarm capability for indicating out-of-tolerance camber and a recorder for recording the camber and temperature of the rails.

7 Claims, 6 Drawing Figures

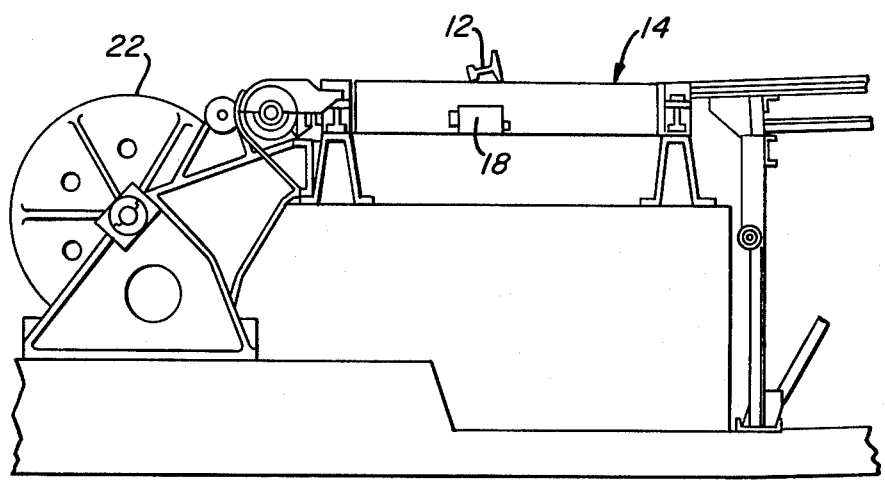
FIG. 2
TOP OF RUNOUT TABLE
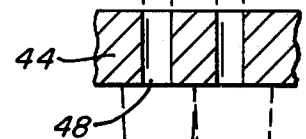
FIG. 4
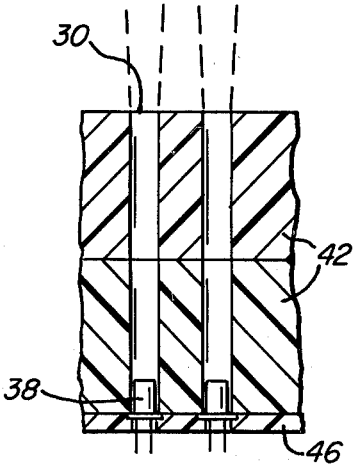

APPARATUS FOR MEASURING CAMBER IN RAILS

BACKGROUND OF THE INVENTION

1. Field of the Invention

This invention relates to the manufacture of rails. More particularly, it relates to an electronic means for measuring camber in hot rails produced in a rail mill.

In the manufacture of rails, there is a significant problem in producing a straight rail. This problem arises because of the unsymmetrical nature of a rail about an axis parallel to its base. The head of the rail, being a much larger mass than the base, cools slower and contracts more than the base. This uneven thermal contraction causes a straight hot rail to assume a curvature as it cools, with the head of the rail concave from end to end. To compensate for this curvature and thereby produce a straight rail, a camber is mechanically introduced in the rail when it is hot by imparting bending forces to it opposite to the curvature of its natural contraction.

The cambering of the rails in a rail mill is accomplished in a camber machine located up-stream of a runout table and cooling beds. The camber machine consists of a set of horizontal rolls with a vertical roll on each side of the horizontal rolls. It is set to slightly bend the rail so as to make the head or top surface of the rail convex from end to end. Since the amount of thermal contraction is a function of the rail section, the amount of camber must be adjusted to correspond to rails of different sections.

As the rails pass through the camber machine, support is provided at the exit of the machine by the runout table. From the runout table the rails pass onto the cooling beds.

2. Description of the Prior Art

To determine the amount of camber required to compensate for the contraction of a particular rail section, the practice in the past has been a very crude and inaccurate trial and error procedure. The operator of the camber machine was required to walk away from his station and onto a bridge spanning the runout table. From that vantage point he would observe chalk marks which were placed on an apron between two runout table rolls, about one rail length away, and at intervals of not less than ½ inch to 1 inch. If the rail was not close to the chalk mark corresponding to the camber for that rail section, he would go back to the camber console and adjust the camber to what he thought would be the proper amount. However, he would not know until approximately six hours later when the rail had cooled whether his measurement and subsequent adjustment was accurate. The distance from the bridge to the marks, the distance between the marks, and the operating conditions of the mill serve to make the chalk marks poor reference points and the system itself fraught with inaccuracies.

Those rails which were not properly cambered are crooked when they are cooled and require further processing in a gag press before they can be sold. Excessive straightening requires a considerable amount of time and expense and adds to the production costs of the rails.

SUMMARY OF THE INVLENTION

A plurality of infrared sensitive phototransistors are arranged in a scanning head configuration on a line perpendicular to the path of travel of the rails. When the leading end of a rail passes over the scanning head, those phototransistors which are exposed to the infrared radiation of the rail give an electrical output which in conjunction with logic circuitry indicates the camber of the rail. The camber and temperature of the rail are recorded and an alarm is provided for signalling when rail camber falls outside of acceptable tolerances.

OBJECTS OF THE INVENTION

The principal object achieved by this invention is an improvement in the accuracy of camber imparted to rails in a rail mill and thereby a reduction in the number of improperly cambered rails requiring further processing.

Another object is increased accuracy of measurement of camber.

Another object is a continuous measurement of the camber of the rails.

Another object is providing the camber machine operator with a visual and audible alarm when acceptable camber tolerances are exceeded.

Another object is a permanent record of the actual camber and temperature of the rails to improve camber specifications for different rail sections and to provide performance data for the camber machine operator.

Another object is to provide automatic feedback control for the camber machine.

The invention, its objects and advantages will become more apparent from the detailed description which follows.

BRIEF DESCRIPTION OF THE DRAWINGS

FIG. 2 is a section view of the mill taken along line II—II of FIG. 1.

FIG. 4 is an optical development of the scanning head taken along line IV—IV of FIG. 3.

DESCRIPTION OF THE PREFERRED EMBODIMENT

Figure 1:
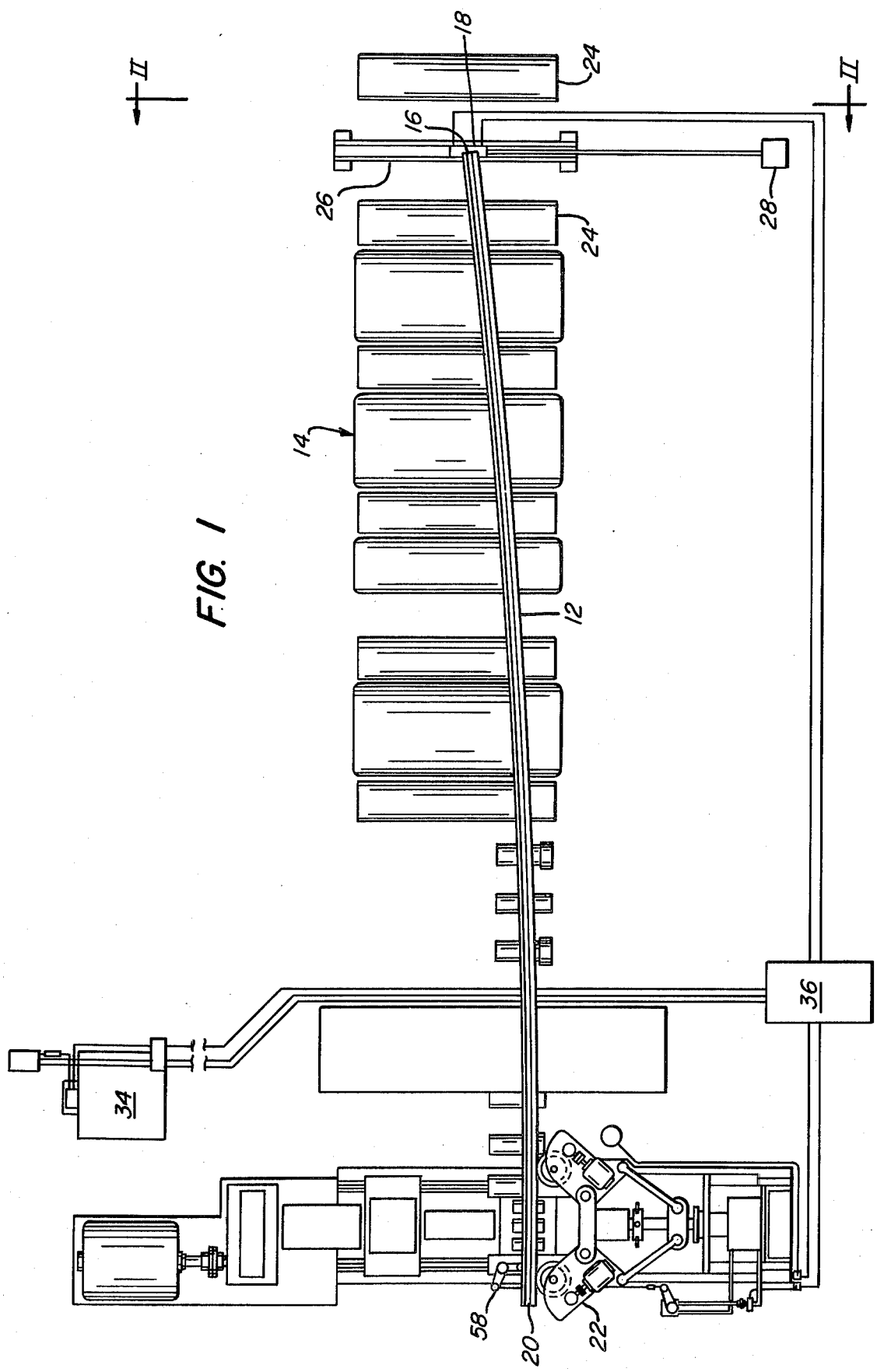
FIG. 1 is a general plan of the exit end of a rail mill including the camber measuring device made in accordance with the present invention.
Figure 3:
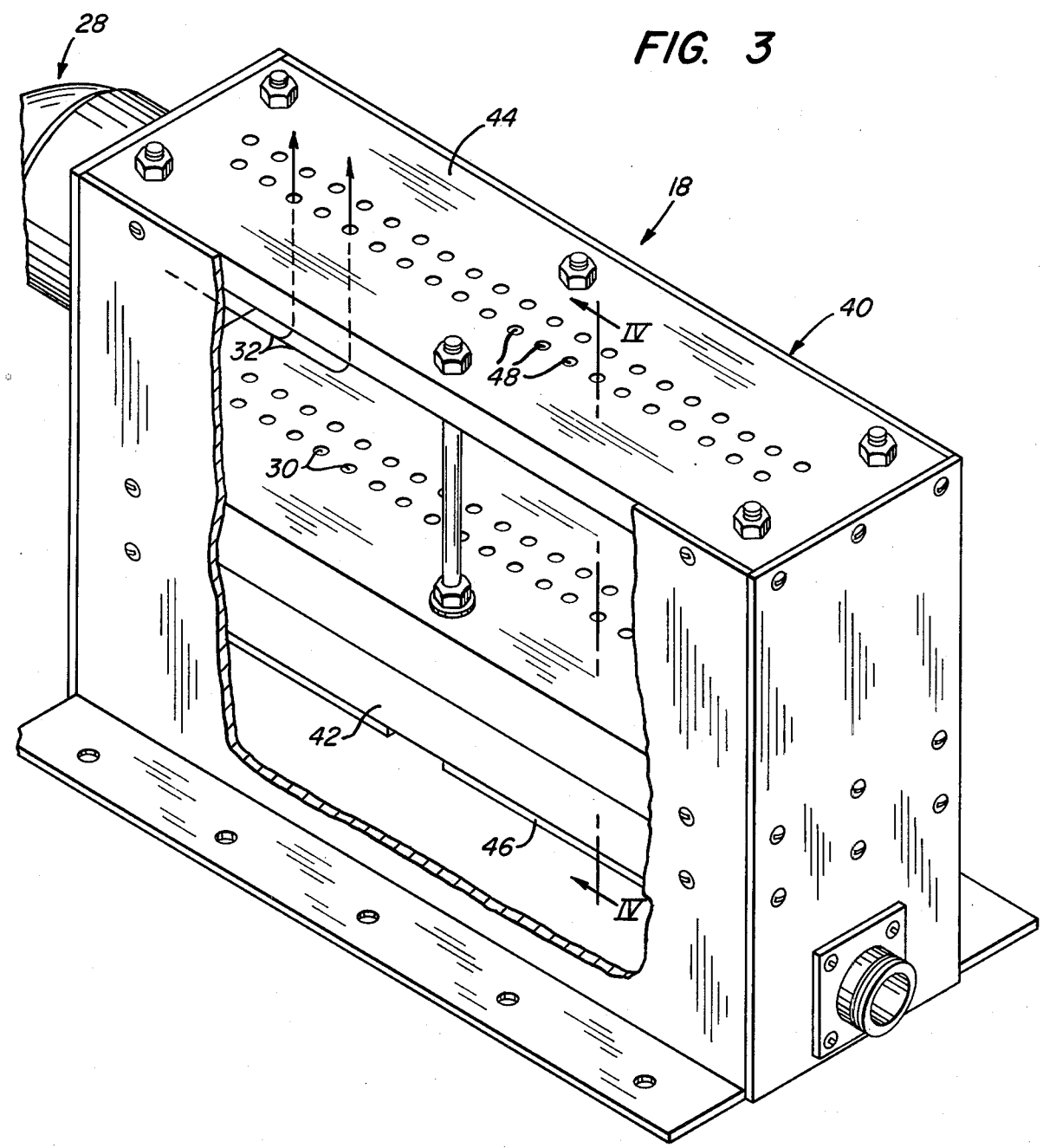
FIG. 3 is an isometric view of the scanning head.
Figure 5:
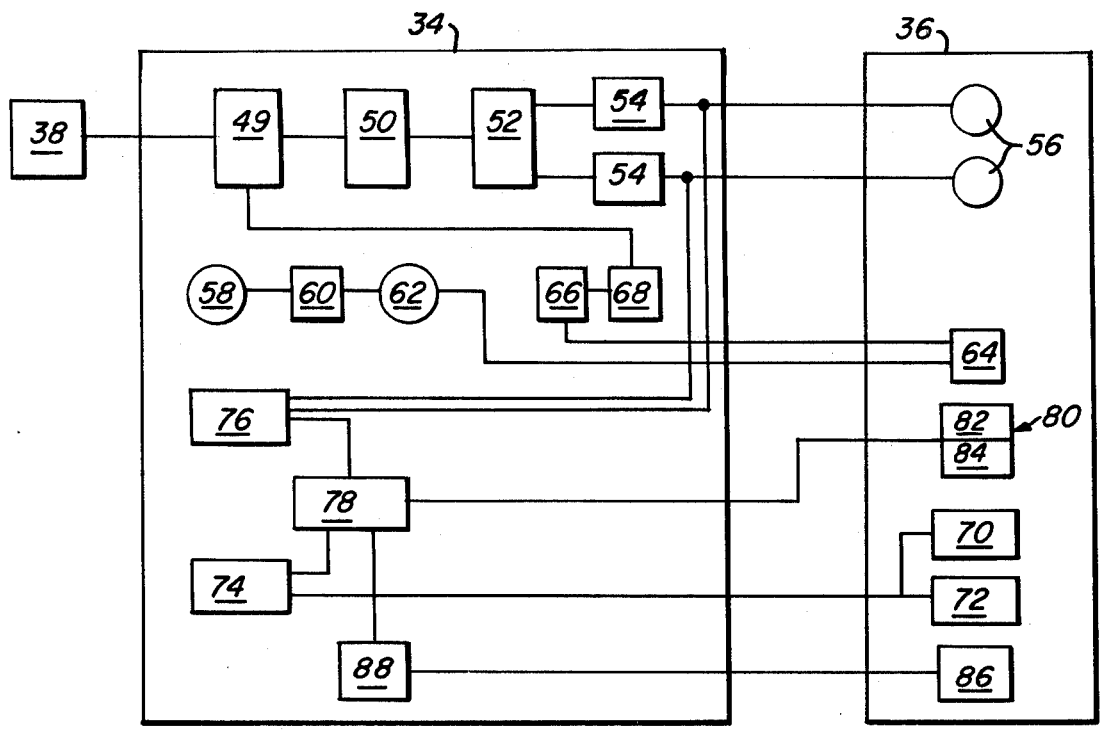
FIG. 5 is a block diagram of the logic circuitry of the present invention.
Figure 6:
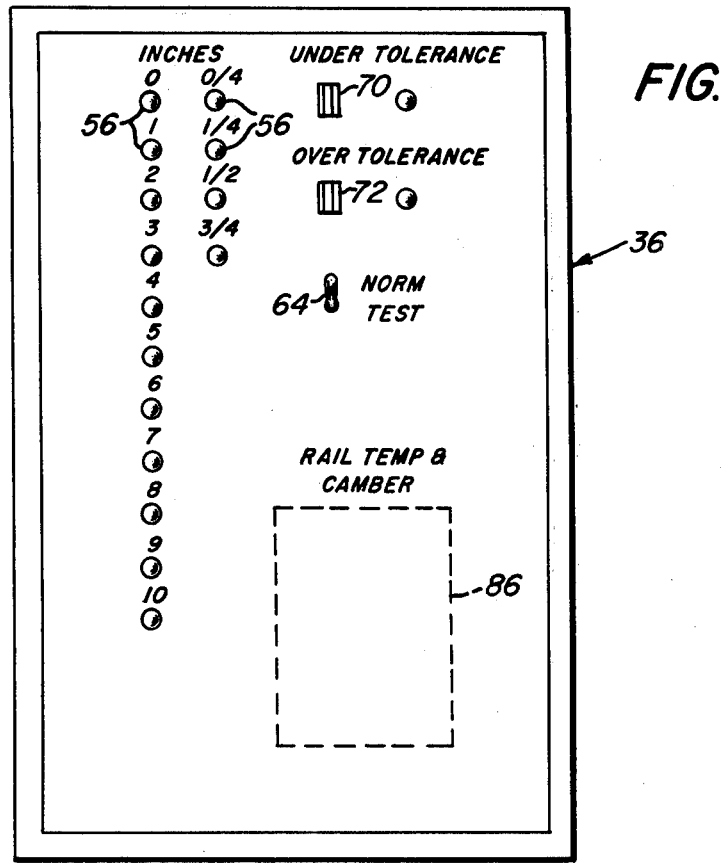
FIG. 6 is a front elevation view of the display panel.

The general layout of the exit end of a rail mill is shown in FIG. 1. Rail 12 is depicted as moving along runout table 14. Leading end 16 of the rail has reached a position over scanning head 18 while trailing end 20 is not quite free of camber machine 22. As best seen in FIG. 2, scanning head 18 is positioned slightly below the surface of runout table 14 so as to be out of the path of travel of rail 12. The scanning head lies between two table rolls 24 on support 26 approximately one rail length, typically about 39 feet, from camber machine 22. Blower 28 is connected to the scanning head to provide a positive pressure within the scanning head to prevent mill scale from collecting in the light apertures 48 (FIG. 3) of the head. Air flow through the scanning head is generally in the direction of arrow 32 (FIG. 3). Instrumentation console 34 houses the solid state logic system for translating input from the scanning head into a visual and audible signal at the operator's readout console 36 (FIGS. 5 and 6).

THE SCANNING HEAD

Details of the scanning head 18 may be seen in FIGS. 3 and 4. A plurality of phototransistors 38 are arranged in a scanning relation in two linear rows on ½ inch centers on the bottom of a micarta and steel housing 40 (FIG. 4). The rows of phototransistors are staggered so that the effective centers are ¼ inch apart. Housing 40 comprises a micarta base 42 and a steel top plate 44 spaced apart from the base. Micarta base 42 is provided with light apertures 30 which serve as receptacles for the phototransistors 38 as well as for providing a light path to the phototransistors. Micarta cover plate 46 serves to hold the phototransistors in place in base 42. Steel top plate 44 is provided with apertures 48 in vertical alignment with the apertures 30 in base 42. Acting together base 42 and top plate 44 produce a collinator effect for masking radiation received by the phototransistors. Each phototransistor reads an area at the top of the runout table which is 13/32 inch in diameter. Thus, the phototransistors arranged in this scanning relation are able to cover a continuous path from the first phototransistor in line to the last one.

THE INSTRUMENTATION

In the preferred embodiment of the invention any appropriate logic circuitry may be utilized to translate the infrared light energy to a visual display by light emitting diodes (LED's) of the location of that point of the rail which is furthest from the centerline of the mill and to indicate by sounding an alarm at readout console 30 when a desired tolerance is not met. More than one phototransistor in the scanning head is subject to exposure by infrared radiation from the rail as the cambered rail passes over quite a large number of the transistors after the rail leaves the camber machine. The phototransistor which is the greatest distance from the centerline of the mill and is exposed indicates the camber of the rail. This one phototransistor is determined by a solid state logic system which is housed in instrumentation console 34.

It is elementary to combine a series of logic elements to operate on given data and perform a desired function. For this reason it is not necessary to describe here, other than in general terms, the logic circuitry of this invention. The critical function of the logic system is to shut off input from all exposed phototransistors except the one furthest from the centerline of the mill.

The instrumentation may be divided into two parts. The first part deals with the determination and visual indication of the camber of the rail. The second part deals with the alarm system.

CAMBER DETERMINATION

Each phototransistor 38 is connected to a respective J-K flip flop 49, which in turn is connected to a respective "AND" gate 50. When any "AND" gate is actuated, it blocks out all "AND" gates of lower number, whereby when the phototransistors of lower numbers are later actuated by the cambered rail passing over them, they transmit no signal. Each "AND" gate is connected to a plurality of additional "NAND" gates 52 and lamp drivers 54, which in turn are connected to respective LED's 56. By proper circuitry, the proper LED's are selected to indicate the integer and the fraction representative of the distance from the centerline of the mill and the end of the cambered rail. The scanning head need not cover the entire distance between the centerline and the camber range, since all rails are cambered to some degree. For example, the scanning head may extend for 10 inches, but the lowest number phototransistor may be 15 inches from the centerline. A constant correction of 15 inches is then added to the camber measurement to give the true camber.

Also included are a pressure switch 58 for energizing the system when a rail enters, A-C input with signal converter 60, a timer 62 for automatic reset prior to entry of the next rail, a test switch 64 for operation independent of the presence of a rail for test purposes, and single shot relay 66 and lamp driver 68 for illuminating the camber indicating LED's until the system is reset.

THE ALARM SYSTEM

The second part of the instrumentation of this invention is the alarm system. The desired over and under tolerance limits are preset at the operator's readout console according to the specification of the particular rail section being rolled. Two set point switches 70 are used to set the under-tolerance limit. Two set point switches 72 are used to set the over-tolerance limit. These limits are tied to the reference resistance ladder 74. Input from the exposed phototransistor furthest from the centerline of the mill which represents the camber is tied to the signal resistance ladder 76. The comparator 78 by comparing the signal with the reference points determines if the camber is out of the permissible limits. If the limits are exceeded, the alarm 80 will be energized. Alarm 80 includes both a visual display of LED's 82 and an audible alarm 84.

In addition to the alarm, a recorder 86 is included in the system for making a permanent record of both camber and temperature for each rail. The temperature of the rail is measured at the camber machine and is independent of the camber measuring system. For recording the camber of the rails the signal from the resistance ladders is utilized. The camber is recorded in terms of voltage directly proportional to the camber as determined from the signal resistance ladder 76. An operational amplifier 88 is used to drive the recorder.

Although the preferred embodiment of this invention has been illustrated and described, it is not intended that the invention described in the following claims is limited to this embodiment.

I claim:

1. The combination, with a cambering machine and a runout table over which cambered workpieces travel on leaving said machine, of an improved apparatus for measuring the camber in a workpiece, said apparatus comprising:
   a scanning head near the exit end of said runout table and including a plurality of phototransistors arranged in at least one row extending across the path of the workpieces in a position to be traversed by each workpiece;
   a display device for indicating the extent of camber in each workpiece traversing said scanning head; and
   circuit means connecting said phototransistors and said display device.

2. A combination as defined in claim 1 in which said circuit means includes means for blocking all said phototransistors except the first one traversed by a workpiece.

3. A combination as defined in claim 1 in which said display device includes means for displaying the integer component and the fractional component of said camber.

4. A combination as defined in claim 1 in which said circuit means includes alarm means.

5. A combination as defined in claim 4 in which said alarm means comprises:
   means for presetting over-tolerance and under-tolerance for said camber;
   means for comparing said camber with said tolerances; and
   means for energizing an audible and a visual alarm when said camber exceeds said tolerances.

6. Apparatus for measuring camber in a moving hot rail which comprises:
   a scanning head for sensing the presence of said rail as said rail passes which includes:
      a plurality of phototransistors arranged in scanning relation linearly and equi-spaced on an axis transverse to the direction of travel of said rail;
   an instrumentation console which includes:
      a first circuit means for energizing said scanning head,
      a second circuit means for transforming signals from said scanning head into a camber signal, and
   a readout console which includes:
      a third circuit means interconnecting said instrumentation console for translating said camber signal into a visual display of said camber;
      a fourth circuit means for presetting tolerance limits of said camber; and
      a fifth circuit means for energizing an alarm when said tolerance limits are exceeded.

7. Apparatus for measuring camber in a moving rail in a rail mill, said mill including a camber machine for cambering said rail with a runout table connected thereto for supporting said rail, said apparatus comprising:
   a scanning head located in said runout table a distance away from said camber machine beneath the path of travel of said rail, said scanning head having a plurality of phototransistors arranged in a scanning relation on an axis transverse to the direction of travel of said rail for sensing the presence of said rail in a position above said phototransistor, and
   circuit means for indicating that the presence of said rail has been sensed;
   circuit means for isolating the signal from the phototransistor furthest from the centerline of said mill which has sensed the presence of said rail; and
   circuit means for indicating from which of said phototransistors said signal originated wherein said indication is analogous to said camber.

* * * * *